March 6, 1928.
E. E. VECCHI
1,661,641
EMERGENCY DEVICE FOR AUTOMOBILES
Filed Oct. 25, 1926
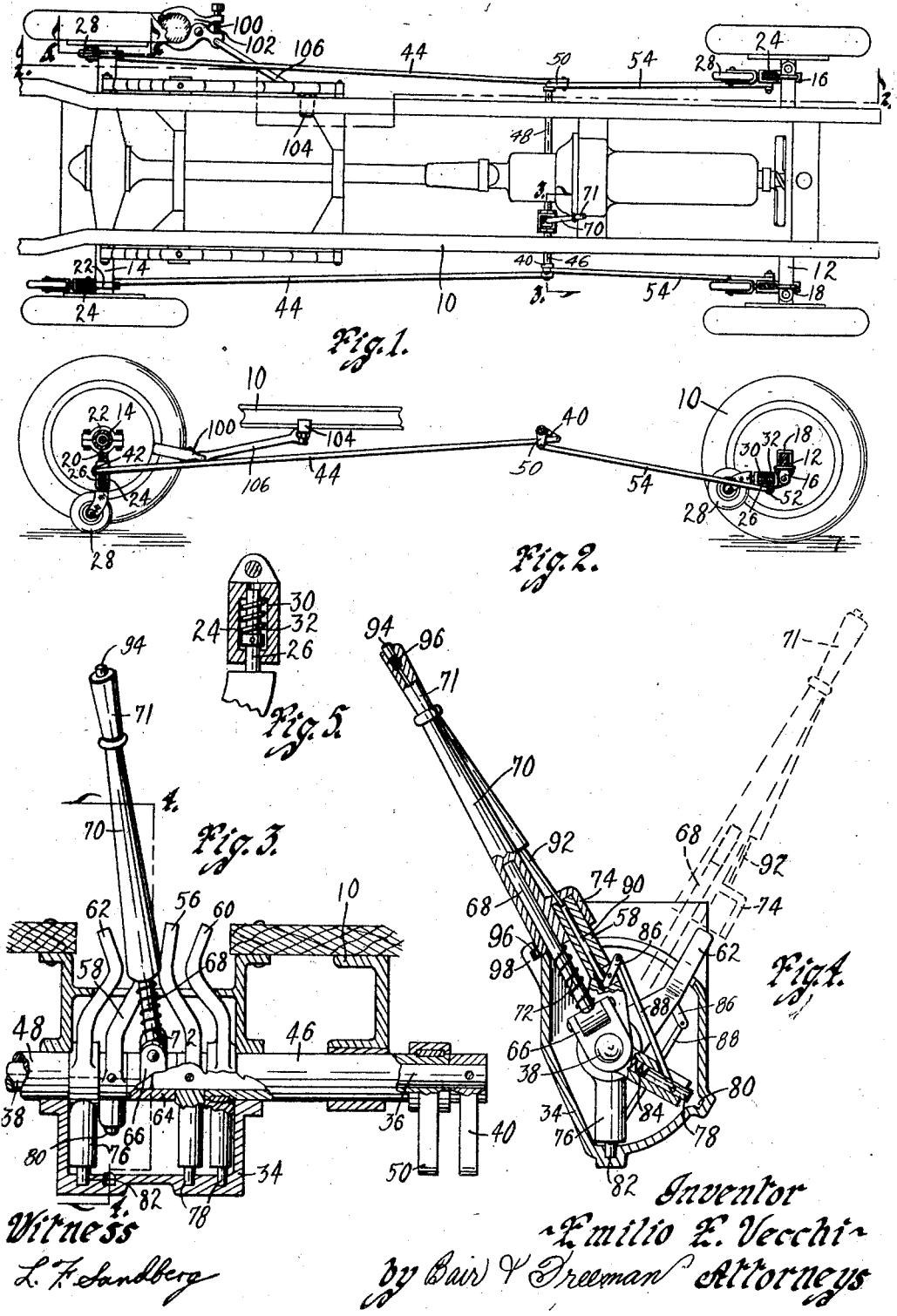
Inventor
Emilio E. Vecchi
by Bair & Freeman Attorneys
Witness
L. F. Sandberg Patented Mar. 6, 1928.

1,661,641

UNITED STATES PATENT OFFICE.

EMILIO E. VECCHI, OF DES MOINES, IOWA.

EMERGENCY DEVICE FOR AUTOMOBILES.

Application filed October 25, 1926. Serial No. 143,981.

The object of my invention is to provide an emergency device for automobiles in the form of caster wheels, the device being of simple, durable and comparatively inexpensive construction.

Still a further object is to provide such an emergency device which may be used when a tire is punctured or a wheel is broken etc.

Still a further object is to provide a caster wheel for each wheel of the automobile and to provide means for lowering these caster wheels as desired.

Still a further object is to provide a lever for lowering any one of the caster wheels and thereby raising the corresponding corner of the automobile when the tire is punctured so that the caster wheel supports that corner of the automobile and it is not necessary to run on the flat tire and damage the casing.

Still a further object is to provide a single lever and novel mechanism for operating the lever to selectively lower the caster wheels.

Still a further object is to provide means for locking the caster wheels in either raised or lowered position.

Still a further object is to provide mechanism for operating the lock for each caster wheel from the operating lever.

Still another object is to provide a lock for a rear wheel of the automobile when the caster wheel corresponding to that wheel is lowered.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of an automobile illustrating my emergency device mounted thereon.

Figure 2 is a sectional view on the line 2—2 of Figure 1.

Figure 3 is an enlarged detail sectional view on the line 3—3 of Figure 1.

Figure 4 is a detail sectional view on the line 4—4 of Figure 3; and

Figure 5 is an enlarged detail sectional view on the line 5—5 of Figure 1.

On the accompanying drawing, the reference numeral 10 indicates generally the chassis of an automobile. The front axle of the automobile is indicated at 12 and the rear axle at 14. Secured to the front axle 12 is a bracket member 16 which is attached to the axle by means of a U-bolt 18. A bracket member 20 is attached to the rear axle housing 14 by a clamp 22. There are four of the bracket members as clearly illustrated in Figure 1. Pivoted to the brackets 16 and 20 are tubular members 24 for receiving the spindles 26 of the caster wheels 28.

A collar 30 is secured to each spindle 26 and a spring 32 is interposed between the collar 30 and the upper end of the tubular member. The purpose of this construction is so that the caster wheels 28 may swivel whereby they do not affect the steering of the automobile and the springs provide a resilient mounting to absorb shocks.

In order to lower and raise the caster wheels 28, I have provided the following described mechanism.

A casing 34 is secured to the floor or some suitable part of the automobile. Extending from the casing 34 are shafts 36 and 38. Secured to the outer ends of the shafts 36 and 38 are rock arms 40. Pivoted to the free ends of the rock arms 40 and to lugs 42 on the rear tubular members 24 are links 44. Thus it will be seen that a rocking motion of the shafts 36 and 38 will raise or lower the rear caster wheels 28 as desired. Extending from the casing 34 and encasing the shafts 36 and 38 are sleeves 46 and 48. Secured to the outer ends of the sleeves are rock arms 50 which are connected to the lugs 52 on the front tubular members 24 by links 54.

It is obvious that a rocking motion given to the sleeves 46 and 48 will raise or lower the front caster wheels as desired. When any of the caster wheels 28 are lowered, they raise the tire a slight distance as clearly illustrated in Figure 2 and due to the particular leverage provided in the construction of my device, this is easily done without much energy. Secured to the inner ends of the shafts 36 and 38 and within the casing 34 are rock arms 56 and 58 and secured to the sleeves 46 and 48 are rock arms 60 and 62.

The novelty of my device is in the provision of mechanism for selectively moving the arms 56, 58, 60, or 62 whereby any desired caster wheel may be lowered when a tire is punctured. This mechanism comprises a sleeve 64 mounted on the inner ends of the shafts 36 and 38 so that it is free to rotate thereon. Pivoted to ears 66 for lateral movement is a rod 68. Slidably mounted on the rod 68 and normally held in a raised position as indicated by dotted lines in Figure 4 is an operating lever 70. The lever 70 is held in the raised position by a coil spring 72 on the rod 68. When it is desired to operate any one of the rock arms 56, 58, 60, or 62, the lever 70 is swung laterally to register with the desired rock arm and then pushed downwardly whereby a socket 74 formed on the lever 70 receives the end of the rock arm so that both the lever and the rock arm when pulled backwardly as indicated in Figure 4 will rock the corresponding shaft 36 or 38 or sleeve 46 or 48.

It is further desirable to have a locking means for the rock arms within the casing 34 and such means is provided in the following manner.

Extending downwardly from each rock arm is a socket 76 and slidably received therein is a plunger 78 adapted to coact with notches 80 and 82 in the casing 34. The plungers 78 normally engage the notches due to the action of springs 84 within the sockets 76. For disengaging the plunger 78 from the notches I provide a lever 86 pivoted in each rock arm and connected by a link 88 to the plunger 78. A rod 90 is slidably mounted in the rock arm and adapted when pushed downwardly to engage the lever 86 thereby withdrawing the plunger 78 from the notch.

For actuating the rod 90 from the handle 71 of the lever 70 I provide a slidably mounted rod 92 and a button 94 adapted to be pressed by the thumb of the operator. The rod 92 extends through the upper end of the socket 74 and is adapted to engage the rod 90. The button 94 is normally held in raised position by a spring 96. In the operation of the device, the lever 70 is in the dotted line position shown in Figure 4. It is moved to register with the desired rock arm extending from the casing 34 and is then pushed downwardly against the action of the spring 72 whereby the socket 74 receives the rock arm. The button 94 is pressed downwardly for releasing the plunger 78 from the notch 82 and the lever 70 is pulled toward the operator whereby the desired caster wheel 28 is lowered to engage the ground and to raise the corresponding corner of the automobile. While the lever 70 is being pulled backward, the button 94 is released and the plunger 78 engages the inside of the casing 34 until it registers with the notch 80 and it then drops into the notch due to the action of the spring 84. When the lever 70 is pulled to its rear-most position, a lug 96 thereon engages beneath a hook 98 on the casing 34 so that it cannot be raised. The purpose of this is so that the lever does not extend any further into the car than is necessary.

For raising the caster wheel, the plunger 78 is disengaged from the notch 80 as shown in the full line position in Figure 4 by pushing the button 94, the lever 70 is moved forwardly until the plunger 78 engages the notch 82 and is then released whereby the spring 72 causes it to assume the dotted line position. When one of the rear wheels of the automobile is raised, it is necessary to provide a lock to prevent rotation of the wheel in order that the car may operate. If no lock was provided, the wheel would merely spin, due to the action of the differential. This locking means consists of a pair of clamp members 100 for encircling the tire on the rear wheel and for engaging the rim thereof. The clamp members 100 are held in engagement with the rim by a set screw 102. A clamp 104 is provided for attachment to the frame of the automobile and is connected to the clamp members 100 by a link 106.

From the foregoing it will be seen that I have provided an emergency device for automobiles whereby caster wheels are clamped near each wheel of the automobile and any one of them can be lowered to act as a temporary substitute for the wheel.

I have provided a novel and efficient means for lowering the caster wheels selectively by the use of but one operating lever. I have also provided a novel means for locking the caster wheels in either raised or lowered position and mechanism for operating the lock from the handle of the operating lever.

Some changes may be made in the construction and arrangement of the various parts of my invention, without departing from the real spirit and purpose thereof, and it is my intention to cover by my claims, any modified forms of structure or use of mechanical equivalents, which may be reasonably included within their scope.

I claim as my invention:

1. An emergency device for automobiles comprising caster wheels adapted to be secured to the axles of automobiles and adjacent the wheels thereof, each caster wheel being capable of moving to position for raising its corresponding automobile wheel clear of the ground and means for moving the caster wheels to such position, said means comprising rock arms operatively connected to said caster wheels, an oscillatably mounted rod, a hand lever slidably mounted thereon and a socket in said lever adapted to selectively engage said rock arms upon sliding movement thereof relative to the oscillatably mounted rod whereby the rock arm, so engaged, will be swung upon actuation of said hand lever.

2. An emergency device for automobiles comprising caster wheels adapted to be secured to the axles of automobiles and adjacent the wheels thereof, each caster wheel being capable of moving to position for raising its corresponding automobile wheel clear of the ground and means for selectively moving the caster wheels to such position, said means comprising rock arms operatively connected to said caster wheels, a lever pivoted to swing to position to selectively register with said rock arms, said lever being slidably mounted for coacting with and moving any rock arm when swinging movement is imparted to the lever and a hook adapted to engage said lever when it is in one of its positions and thereby prevent disengagement thereof from the arm with which it coacts when the respective caster wheel for that rock arm is lowered.

3. An emergency device for automobiles comprising caster wheels adapted to be secured to the axles of automobiles and adjacent the wheels thereof, each caster wheel being capable of moving to position for raising its corresponding automobile wheel clear of the ground and means for selectively moving the caster wheels to such position, said means comprising rock arms operatively connected to said caster wheels, a lever pivoted to swing to position to selectively register with said rock arms, said lever being slidably mounted and provided with a socket for receiving the end of any rock arm whereby swinging movement imparted to said lever will lower the caster wheel corresponding to the rock arm with which the lever coacts.

4. An emergency device for automobiles comprising caster wheels adapted to be secured to the axles of automobiles and adjacent the wheels thereof, each caster wheel being capable of moving to position for raising its corresponding automobile wheel clear of the ground and means for selectively moving the caster wheels to such position, said means comprising rock arms operatively connected to said caster wheels, a lever pivoted to swing to position to selectively register with said rock arms, coacting means for moving any rock arm when said lever coacts therewith and swinging movement is imparted to the lever, and locking means for securing each rock arm in either of its extreme positions, said locking means being operable from mechanism mounted on the lever.

5. A device of the class described comprising a casing, a plurality of rock arms mounted therein, means for locking each arm relative to the casing, a lever adapted to selectively register with the rock arms, coacting means for moving any one of said rock arms when said lever is moved, mechanism on said lever for operating the locking means of the rock arm with which the lever coacts, and a plurality of caster wheels each pivoted and operatively connected with a rock arm whereby the caster wheel may be swung on its pivot upon movement of its corresponding rock arm.

EMILIO E. VECCHI.